Figure 1:
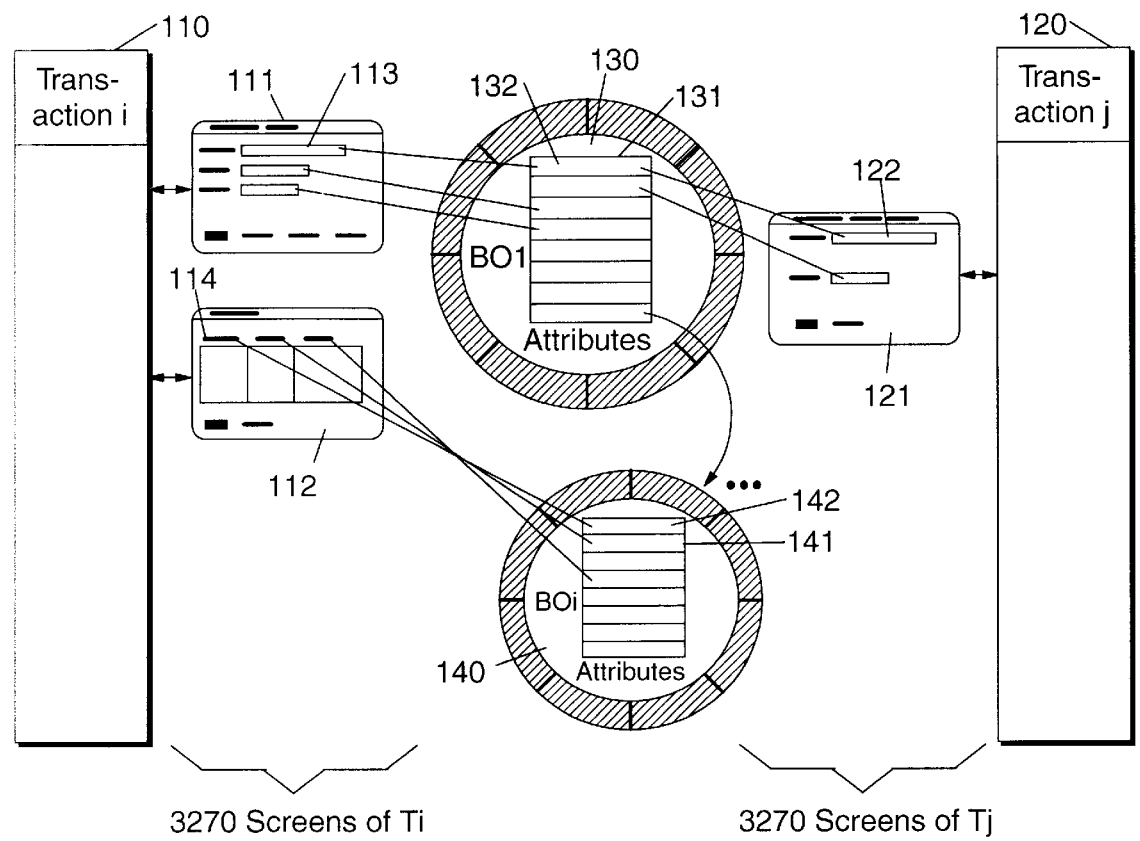

United States Patent [19]
Baumeister et al.

[11] Patent Number: 5,845,289
[45] Date of Patent: Dec. 1, 1998

[54] METHODOLOGY FOR GENERATING OBJECT STRUCTURES FOR ACCESSING CONVENTIONAL, NON-OBJECT-ORIENTED BUSINESS APPLICATIONS

[75] Inventors: Sascha Baumeister, Stuttgart; Michael Beisiegel; Reinhard Duscher, both of Böblingen, all of Germany

[73] Assignee: International Business Machines Corporation, Armonk, N.Y.

[21] Appl. No.: 776,269

[22] PCT Filed: Jun. 7, 1995

[86] PCT No.: PCT/EP95/02181

§ 371 Date: Jan. 21, 1997

§ 102(e) Date: Jan. 21, 1997

[87] PCT Pub. No.: WO95/03573

PCT Pub. Date: Feb. 2, 1995

[51] Int. Cl.$^6$ ................................ G06F 17/30
[52] U.S. Cl. .................. 707/103; 707/1; 707/2; 707/3; 707/4; 395/706; 395/707; 434/118; 434/1; 345/326; 345/338
[58] Field of Search ............... 707/4, 1–3, 103; 395/706, 707, 702, 701, 670, 685, 683, 284, 885, 800, 307; 434/118; 345/338, 326

[56] References Cited

U.S. PATENT DOCUMENTS

| | | | |
|---|---|---|---|
| 5,125,091 | 6/1992 | Stass, Jr. et al. | 395/650 |
| 5,247,669 | 9/1993 | Abraham | 707/103 |
| 5,410,702 | 4/1995 | Abraham | 395/670 |
| 5,603,043 | 2/1997 | Taylor | 395/800.01 |
| 5,675,801 | 10/1997 | Lindsey | 395/702 |

FOREIGN PATENT DOCUMENTS 9503573  2/1995  WIPO .

OTHER PUBLICATIONS

Journal of Object—Oriented Programming, vol. 5, No. 1, Mar. 1992, pp. 31–42, XP 000563080, Graham, "Migration Using SOMA: A Semantically Rich Method of Object—Oriented Analysis".

*Primary Examiner*—Thomas G. Black
*Assistant Examiner*—Diane D. Mizrahi
*Attorney, Agent, or Firm*—Edward H. Duffield

[57] ABSTRACT

The invention proposes a method of defining and generating cooperating object structures for accessing Business Applications (BAs) which were not built upon the principles of object orientation (OO) in an OO manner. One step of the method is targeted at the definition of true Business Object (BO) classes with a unique meaning as entities or concepts in terms of the underlying business as supported by the BA. As the BAs process the business relevant data, their spectrum of the input and output parameters serve to define the BO Attributes (BOAs) of the individual BO classes. A further step of the method is the encapsulation of the individual BAs within Transactional Object (TO) classes for controlling and executing the BAs. TO instances are able to autonomously extract BOA values from the BO instances to assemble the input parameters for BA execution. The TO instances are also endowed to process the output parameters as returned by the BA to materialize BOs, i.e. to extend existing BOs with with new BOAs or to instantiate new BO instances. Interacting with the BOs may transparently result in executing BAs with the TOs thus the BOs support an OO-access of the BAs. The BAs may even be executed on a remote data processing system as TOs are able to drive communication protocols.

19 Claims, 5 Drawing Sheets

Communication Object

Transactional Object

METHODOLOGY FOR GENERATING OBJECT STRUCTURES FOR ACCESSING CONVENTIONAL, NON-OBJECT-ORIENTED BUSINESS APPLICATIONS

1 BACKGROUND OF THE INVENTION

1.1 Field of the Invention

The present invention relates to a method allowing and guiding the integration and migration of Business Applications (BA) executed on a data processing system into modern environments based on object-oriented technology (OOT). In particular the present invention relates to a method of generating an object-oriented (OO) access to BAs executed on a data processing system where said BAs do not correspond to the paradigm of object-orientation and are assumed to follow conventional non-OO principles.

1.2 Description and Disadvantages of Prior Art

Exploiters of information technology as well as information technology itself are confronted with a new dimension of flexibility and adaptability challenges for software supporting and controlling their business. Of course the software development techniques are confronted with these requirements too. On one hand business initiatives are the creators of these demands on the other hand information technologies themselves are the driving forces.

Companies are coping with new and changing market requirements. Improved customer services and time-to-market are key differentiators. Globalization of markets, organizational changes like decentralization, new cooperations require new business structures and concepts. As an answer to these challenges companies are attempting to re-engineer the underlying business processes to a serious extend. Business application software encompassing a huge spectrum of different application types, like Online Transaction Processing Applications (OLTP), data base applications etc., has an important supporting and enabling element in this arena it has to follow these tracks. The situation is even worse as information technologies themselves undergo drastic changes by offering new technologies like Client/Server, multi-media and object-oriented (OO) technologies.

The attempt to integrate, to migrate or to adapt existing BAs to these changes in general and to OOT in specific, as OOT becomes more and more important and is believed to be the unifying approach for accessing other types of new technology, various approaches are known.

If the origins of a given application are dated back many years and sometimes even more than a decade and if technologies have been subject of dramatic evolution, a first impulse might suggest to abandon these types of legacy applications, as an adaptation with respect to the new technologies like client/server concepts etc., these applications haven't been prepared for, seems hopeless. No doubt that this kind of approach might be reasonable in certain situations. The decision to "throw away" a legacy application often is a hasty response. Searching for alternatives allowing to "reuse" the legacy applications is worthwhile as they contain valuable knowledge on the business they are supporting. Many person-years would have to be spent for their re-implementation. Also as many companies rely in a vivid sense on their business supporting applications such discontinuities may not be acceptable and more evolutionary approaches may be favorable instead.

Modernization of legacy applications by restructuring could be an alternative attitude. As a result this concept often requires great investment in the old application itself whereas the "visible" effects of modern technologies are very modest compared to the overall effort. Sometimes restructuring an application actually led to a completely new implementation. If on the other hand this "hidden" re-implementation is to be avoided typically one is limited with respect to the freedom of designing the characteristics of the new application structure.

Especially if an application should be made available to object-oriented environments a technique called "wrapping" is available. Wrapping of existing applications means to encapsulate an application in one or a series of objects offering the application's activities as object methods. As this kind of approach is primarily based on the given application implementation this leads to delusive object structures as they are not aligned primarily with objects in terms of the modeled business. Sometimes a complete application is wrapped into a single monolithic object.

1.3 Objective of the Invention

The invention is based on the objective to generate and execute cooperating object structures for accessing BAs, which are not built upon the principles of OOT. The same method should hold also for the case that the BAs are executed on a remote data processing system, i.e. not on the same system as the new object structures.

2 SUMMARY AND ADVANTAGES OF THE INVENTION

The objective of the invention is solved by claim 1. According to the invention the proposed method is targeted at the definition of true Business Object (BO) classes with a unique meaning as entities or concepts in terms of the underlying business as supported by the BA. The BOs are specified by defining their BO attributes (BOA). As the BA is used for processing the business relevant data, it is the spectrum of the input and output parameters of the BA which represent the BOAs of the individual BO classes. Within the OO environment the BAs are realized as Transactional Object (TO) classes which encapsulate the BAs. The TO classes control the execution of the BAs. As BA execution typically requires multiple interactions sending or receiving input or output parameters until BA completion, the TO also tracks the BA state. For the purpose of BA execution the TO classes are responsible to transparently extract the BOA values from the BOs to assemble the input parameters of the BA which are sent to the BA for processing. Besides the BA execution the TO classes also perform the BO materialization processing. BO materialization means to process the output parameters returned by the BA in a first step checking whether the output parameters store data of BOs which have not been instantiated yet. If required the materialization process creates these new BO instances. In the second step the materialization processes the output parameters as returned by the BA to update the corresponding BOAs of the BO instances.

As the BO definition process is not limited by the BA behavior any BO class can be realized thus giving the freedom for a true model of the business world in form of object structures. Delusive object identities can be avoided therefore. The BOs hide the BA structure and are therefore the ideal basis as integration platform with additional applications and new types of graphical user interfaces. Also the BAs might be processed on a remote data processing system, Client/server structures can be realized even if the original BA has not been developed for that purpose. The BO structures offer a persistent storage concept of data transparently accessible and/or modifiable exploiting the BAs.

Encapsulating the BAs in TOs and realizing the association of BAs with the input or output parameters of the BA makes the BOs to a very large extend independent from the structure and peculiarities of the BA. Further advantages of the invention are offered by the materialization process. Materialization has the consequence that when a BO instance is created it will store that part of the BOA values which are offered by the specific BA at that point in time which may be only part of the whole BOA spectrum of the BO.Thus the partial materialization behavior allows to operate with BO instances storing only that part of the BOA values which actually are required by the exploiter. This is of special importance for objects with relevance to the business domain as those might become very large. Extremely economical usage of storage is thus an major advantage and consequence of the materialization approach. On the other hand, during the life-time of a BO instance its attribute spectrum will be completed step-by-step with each further BA execution delivering additional BOA values. Additional materialization processes leading to an incremental completion of the BOA attribute spectrum always guarantee the required data being available.

Additional advantages of the invention are accomplished by claim 2. According to a further embodiment of the proposed invention the individual input or output data blocks, called BA messages, which enclose those input or output parameters sent or received in one interaction with the BA, are encapsulated in a separate object classes, called Transaction Record (TR) classes. Each BA message type is encapsulated within an individual TR class. Besides the input or output parameters themselves the TR class also stores descriptive information on the individual data elements assembling the encapsulated BA message. For example, a BA message date element may be described by its data type (string, numeric, . . . ), its length, its position within the overall BA message and so forth. As most parameters being part of a BA message can be expected to represent BOAS of various BOs, the TR classes in addition store for each BA message data element mapping information for associating it to a unique BOA of certain BO class and vice versa. TO classes encapsulate the BAs and exploit TR instances for creation and exchange of individual BA messages. By associating those TR classes which are of importance for data exchange with the encapsulated BA to the encapsulating TO class, the TO is enabled to exploit functionality offered by the TR.

TRs offer the advantage of introducing a detailed structure of an otherwise unstructured stream of bytes exchanged with the BA. This encapsulation occurs in a modular, object-oriented way. Due to the mapping information stored within the TR classes the TRs are of central importance in contributing to the BO materialization process.

Additional advantages of the invention are accomplished by claim 3. According to a further embodiment of the proposed invention the method separates the spectrum of BOAs into two subsets. The first subset of BOAs, called BO Key Attributes (BOKA), with the outstanding property that each combination of BOKA values identifies uniquely and exactly one BO instance within said BO class independently of the BOA values of a second subset of BOAs, called BO General Attributes (BOGA), which is made up of all the rest of said BOAs.

An advantage of this approach is the possibility to establish a separate access method to an object. Besides accessing an object via traditional object references above concept allows for accessing an object by specifying its BOKA values which by their very nature specify an BO uniquely. This separate access method is fundamental to the materialization process as it allows object structures performing the materialization of a BO without having an object reference of the BO to be materialized.

Additional advantages of the invention are accomplished by claim 4. According to a further embodiment of the proposed invention a so-called BO Instance Space (BOIS) is established as a common storage medium for all BO instances after creation. The BOIS also supports to retrieve a certain BO instance based upon the information of the BO class and the BOKA values of said BO instance, thus BOISs exploit the BOKA concept.

This feature is of importance to enable a partial, step-wise materialization process. For repetitive materialization of BOs cooperating object structures must be able to search for a certain BO to be materialized at a common place enriching the BO instance with further BO data Additional advantages of the invention are accomplished by claim 5. According to a further embodiment of the proposed invention several types of BOISs may be distinguished. One or more so-called explicit BOISs may be exploited for storing and retrieving BO instances of certain BO class; i.e. for each specific BO class it is possible to define in which one of the explicate BOISs a BO instance of that class will be stored. In addition a so-called implicit BOIS will be available which will be used to store BO instances of a certain BO class if none of said explicit BOISs has been defined for storing and retrieving of BO instances of a that BO class.

This multiple BOIS concept increases flexibility. Furthermore it may be used for privacy and security reasons. As another advantage it allows for the provision of BOIS of reasonable sizes, i.e. of BOISs storing a reasonable number of BO instances thus influencing the effectivity for localization of BO instances.

Additional advantages of the invention are accomplished by claim 6. According to a further embodiment of the proposed invention the BOIS concept can be enhanced by control processing for supervising whether any of the BO instances stored within a BOIS is still referenced by any other object in the system. Once a BOIS detects that the last reference to any one of the stored BO instances is removed, i.e. no other object within the system is referring to the BO instance anymore, said control processing of a BOIS deletes said BO instance transparently.

Such a BOIS behavior drastically simplifies the handling of BO instances. It is no longer necessary to explicit delete a BO instance if the present exploiter no longer is interested in the BO instance. It is sufficient that an exploiter gives up the object reference, the BOIS will detect the BO instance not referenced and transparently will delete the BO instance. Independent exploiters of the same BO instance not knowing from one another do not have to synchronize their interest, i.e. whether the BO can be removed or whether another exploiter still requires the BO instance, in the BO instance.

Additional advantages of the invention are accomplished by claim 7. According to a further embodiment of the proposed invention the TO classes are extended by a set of OO-methods embodying an abstract protocol to interact with the BAs. The protocol encompasses a OO-method START, to set up a communication connection using anyone of the available communication protocols, if the BA is executed on a remote data processing system, and to start execution of said BA assigned to the TO class. Further the protocol offers a OO-method STOP, to complete and stop the execution of said BA and, if said BA is executed on a remote data processing system, to close the communication connection to said remote system. Finally the a OO-method TRANSMIT is part of the protocol, to transfer a certain BA messages to the BA for processing, freeing said requester from knowing and understanding any communication details, to wait on a responding BA message returned from the BA as a processing result of the first BA message.

This reduction of the spectrum of interactions with the BA to a common core, i.e. to a common behavior, independent from the concrete technology to be used for data exchange between TO and the BA results in a dramatic simplification as typically a overwhelming number of different, concrete techniques are available which now can be handled in a common way. Especially if the BA is executed on a remote data processing system highly sophisticated and complex network protocols have to be accessed. The approach of the invention allows to map the abstract protocol onto the various concrete protocols. This mapping is implemented only once and then is available for repeated exploitation depending on the actual technology available.

Additional advantages of the invention are accomplished by claim 8. According to a further embodiment of the proposed invention the TO classes are extended with the knowledge and capability of determining its associated TR classes. Likewise the TR classes are extended with the knowledge and capability of determining the TO class they are associated with.

The ability of a TO instance to determine its associated TR classes and TR instances allows to utilize the capabilities of the individual TRs transparently thus relieving the TOs from knowing any details of the BA message. Vice versa the ability of the TR instances to determine its associated TO instance allows the TR instances to transparently access information stored within a TO instance and permits the TRs to utilize it for its processing. Based on these concepts the TO instance can delegate the creation of a BA message including the filling-in of information into the BA message to the TR instances. In general the approach simplifies the OO-method interfaces as objects are equipped with the ability to determine related objects form which a lot of additional information may be retrieved for the own processing which otherwise would have to be passed over the OO-method interfaces.

Additional advantages of the invention are accomplished by claim 9. According to a further embodiment of the proposed invention the TR classes are extended with an OO-method INXACTION. INXACTION determines those BO instances identities to be used for BA message creation using the BOKA values accessible from its associated TO instance. INXACTION accesses the BO instances within the BOIS by said with the help of the BOKA values. Under the control of the TR's mapping information INXACTION extracts the required BOA values from the BO instances to create a BA message and store said BOA values into the related positions of the BA message said BA message data elements. Afterwards INXACTION sends the created BA message by calling the OO-method TRANSMIT of the associated TO instance to the BA for further processing. As the response of the BA has been received INXACTION passes the currently received BA message as BA output over to the OO-method OUTXACTION of that TR instance responsible for handling the received BA output message. Furthermore each of the TR classes is extended with an OO-method OUTXACTION for processing said currently received BA message. In this processing step BO instances will be enriched with BOA values stored in the currently received BA message in a process called Incremental Partial BO Materialization, or Materialization for short. Materialization means that OUTXACTION firstly determines under the control of the TR's mapping information all BO instances touched by the currently received BA message data elements. The BOKA values for the touched BO instances are either retrieved from the currently received BA message BOKA values or are retrieved from the associated TO instance which stores all BOKA values of all BO instances materialized under its control in a context.

Materialization means that OUTXACTION secondly searches, based on said BOKA values, for each touched BO instance within the BOIS. If said touched BO instance could be located in the BOIS it will be used during the materialization process, whereas, if the touched BO instance could not be located within the BOIS, a new BO instance will be created within the BOIS. Materialization means that OUTXACTION thirdly copies, under control of said TR's mapping information, each of the currently received BA message data element into the corresponding BOA of the touched BO instance thus incremently materializes the BOAs of the touched BO instances. Finally OUTXACTION returns to its caller the object references of all touched BO instances materialized during the current execution of OUTXACTION.

The extension of the TR instances with the OO-methods INXACTION and OUTXACTION performing above sequence of activities leads to the advantage that the TO instances are relieved from creating the BA messages to be sent to the BAs from performing the materialization process itself. Instead the TO instances exploit the TR instances for that part of processing. The TO instances limit their activities in controlling the BA execution exchanging BA messages. The spectrum of TO activities becomes more overseeable. On the other hand as the TR instances having available the mapping information between the BA message data elements and the BOAs the TR instances are the ideal place for BA message creation and BO materialization processing resulting in a modular overall structure. The approach benefits from the BOIS concept as for processing the materialization it is of advantage to access BO instances using the BOKA values.

Additional advantages of the invention are accomplished by claim 10. According to a further embodiment of the proposed invention the complete sequence of interactions of said BA execution from the very beginning up to the completion is assembled in one or more sub-units, called Transactional Steps (TST). Each TST autonomously generates and exchanges one or more BA messages with the BA. The TST execution is completed once a BA message is returned by BA, which has been defined as the last BA message of said TST. That last BA message optional defines the start of a next TST. Each of the TSTs is encapsulated as a unique OO-method called Transactional Object Method (TOM) of the TO class.

By introduction of these TOMs it now will be possible to execute a certain part of a BA by TOM invocation. The TOM relieves its caller from creating, sending and receiving BA messages. Also the interpretation of the received BA messages is processed transparently to the caller in the materialization step.

Additional advantages of the invention are accomplished by claim 11. According to a further embodiment of the proposed invention the BO classes are extended by OO-methods, called a Business Object Methods (BOM), encapsulating a functional part offered by BAs. Invocation of a BOM finally will result in calling one or several TOMs of one or more TO instances. Once a BOM is being invoked its execution might first result in the creation of a new TO instance if a TOM is to be executed of a TO instance which is not instantiated yet.

The introduction of these BOMs now allow to execute certain parts of several BAs transparently. Thus the exploiters of the BO instances are shielded completely from the TO and TR structures. They even might not know that these structures do exist.

Additional advantages of the invention are accomplished by claim 12. According to a further embodiment of the proposed invention the BOM and TOM OO-methods are enhanced to return all object references of BO instances materialized during their execution period to their requesters. This allows the requesters to utilize the BA execution results by inspecting the materialized BOs.

Additional advantages of the invention are accomplished by claim 13. According to a further embodiment of the proposed invention one or more Communication Object (CO) classes are introduced offering an abstract protocol consisting in OO-methods START, STOP, TRANSMIT with equal semantics as the abstract protocol of the TO classes. The CO classes are introduced for the purpose of encapsulating aspects relevant for the details of communication with the BAs. Especially if the BAs are to be executed on a remote data processing system, the abstract protocol is mapped onto a concrete communication protocol used to connect data processing systems in a computer network. By associating a CO class to a TO class and extending the START OO-method of said TO instance to create an instance of said associated CO class to call the corresponding START OO-method of said associated CO instance the TO instances are able to utilize the CO instance for the communication with the BA. In the same way the STOP and TRANSMIT OO-methods of said TO instance are extended to call the corresponding methods of said associated CO instance for execution of the concrete protocol the CO instance is based upon.

Generation of one ore more separate CO classes, which map the abstract protocol onto any one of the available concrete communication protocols improves the modularization of functional components. At the same time it increases flexibility as the TO easily may be enabled to process the abstract protocol over any of the available concrete protocols by just associating the relevant CO class with the TO class.

A further objective of the invention is solved by claim 17 together with additional advantages of the invention accomplished by claim 18 and 19. According to the invention the proposed method is targeted at the execution and interplay of the object structures as discussed above. These object structures might be derived by the method outlined in claim 1 to 13 or some other techniques.

Many benefits of this execution method have be discussed already. For more details it is therefore referred to the above passages.

3 BRIEF DESCRIPTION OF THE DRAWINGS

Figure 7:
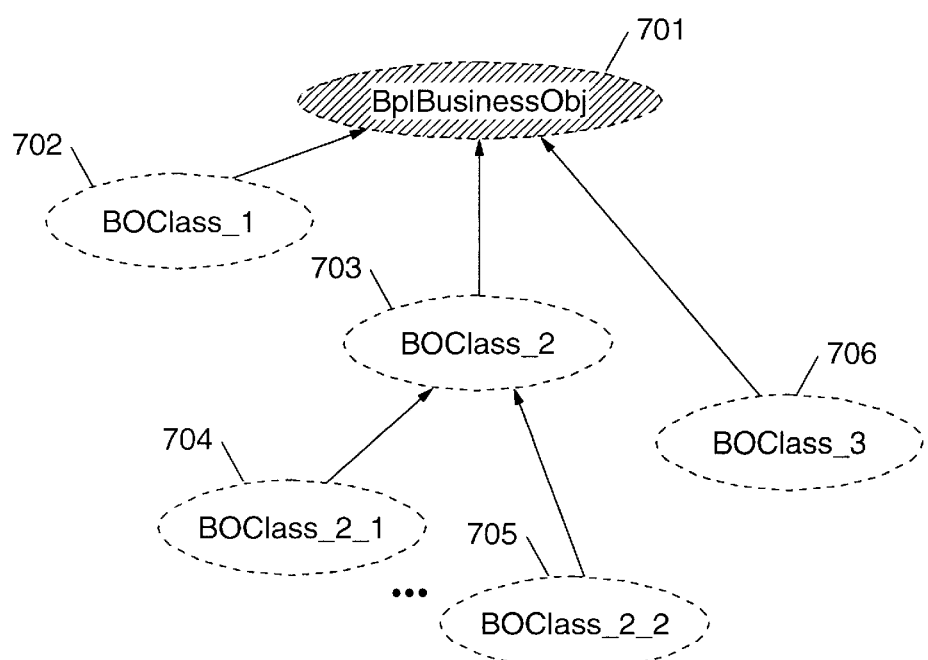
Figure 2:
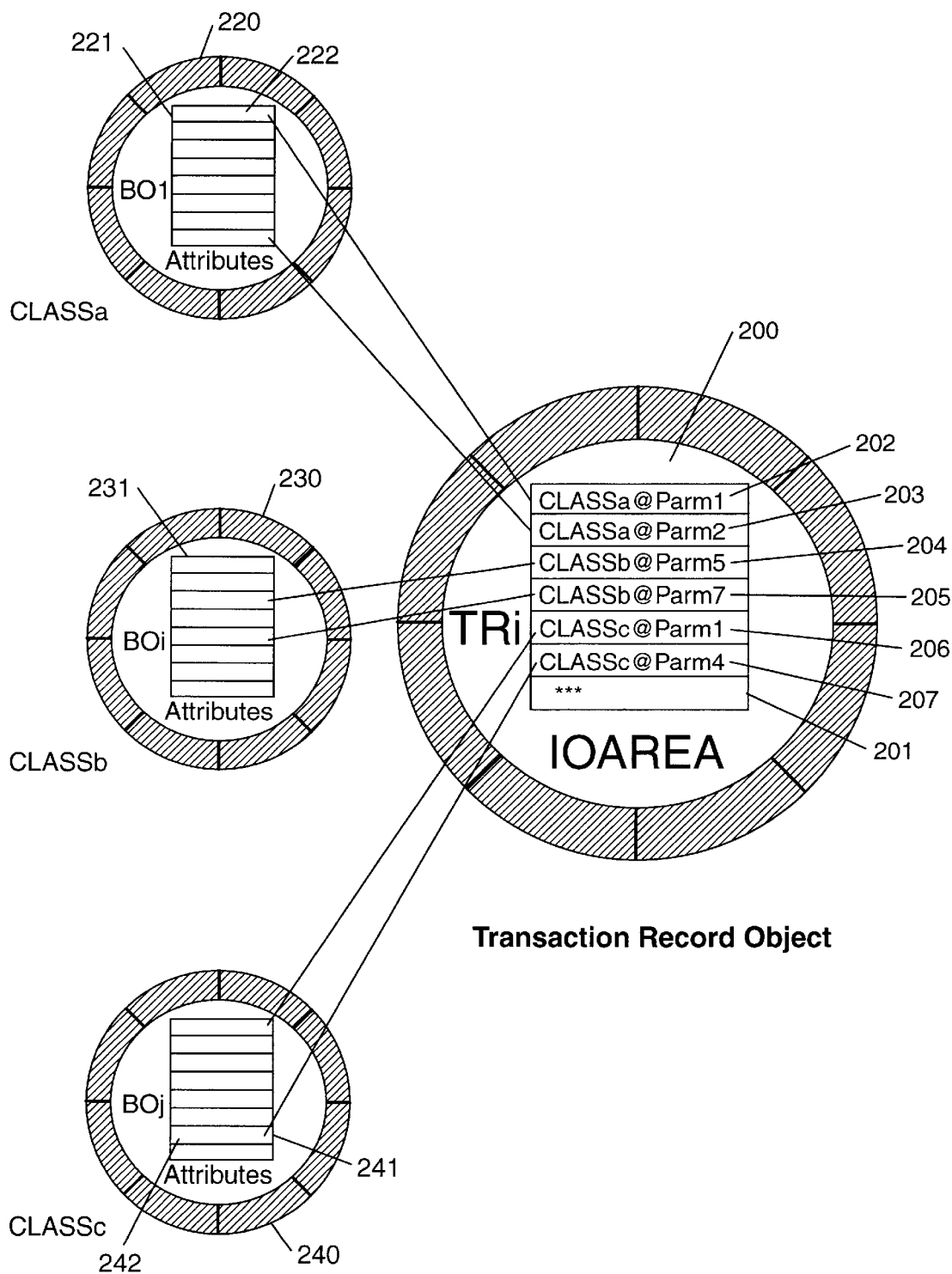
Figure 3:
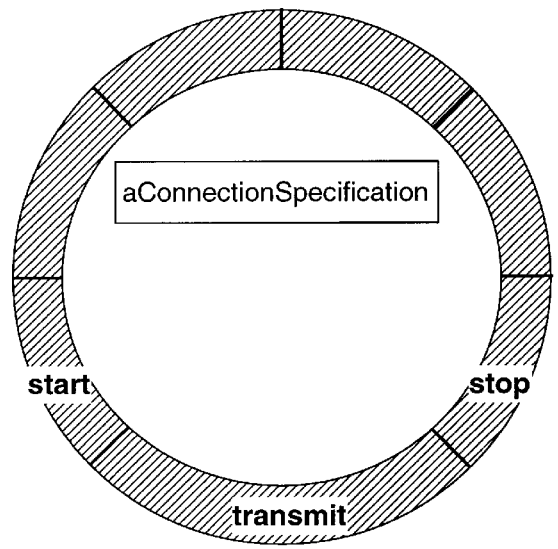
Figure 4:
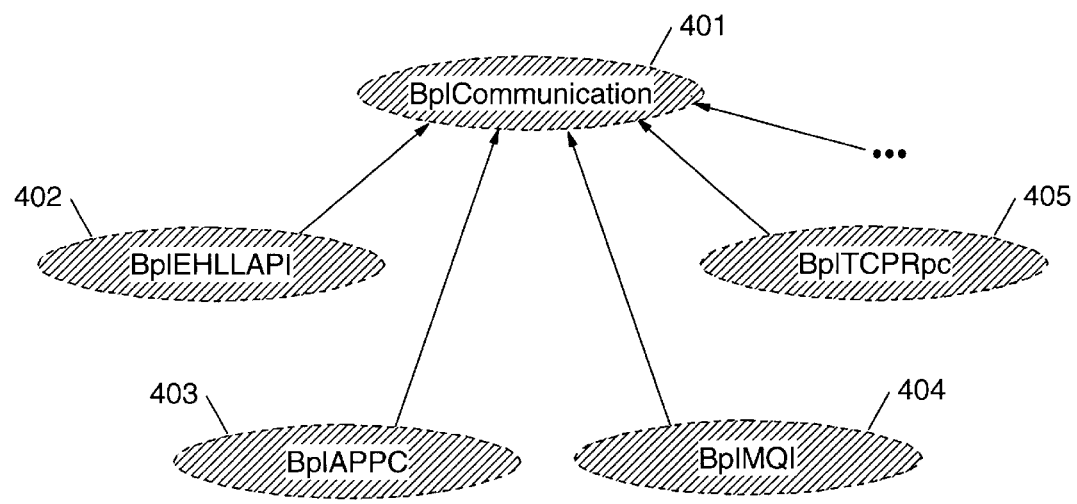
Figure 5:
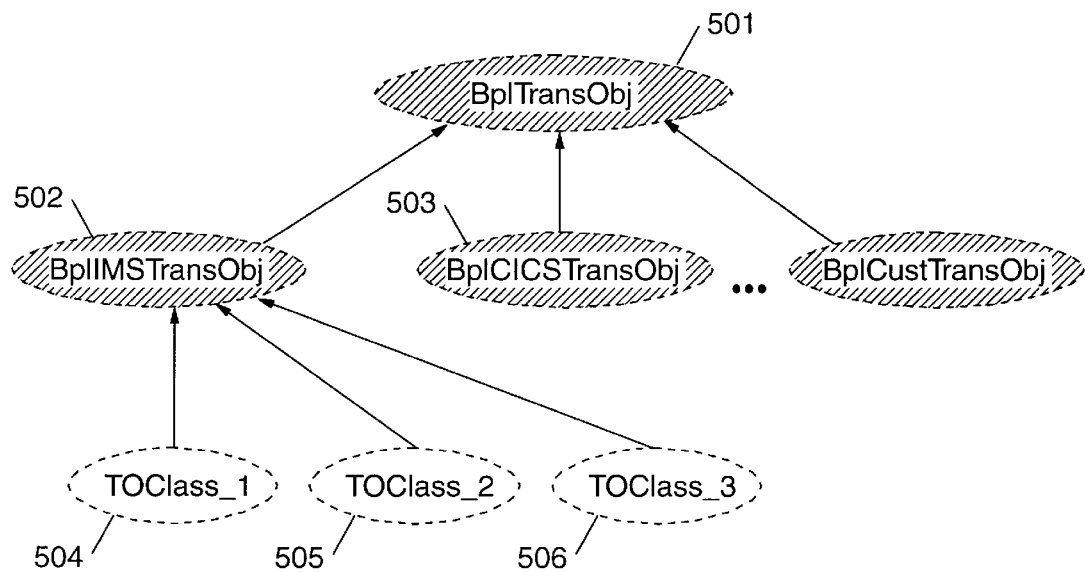
Figure 6:
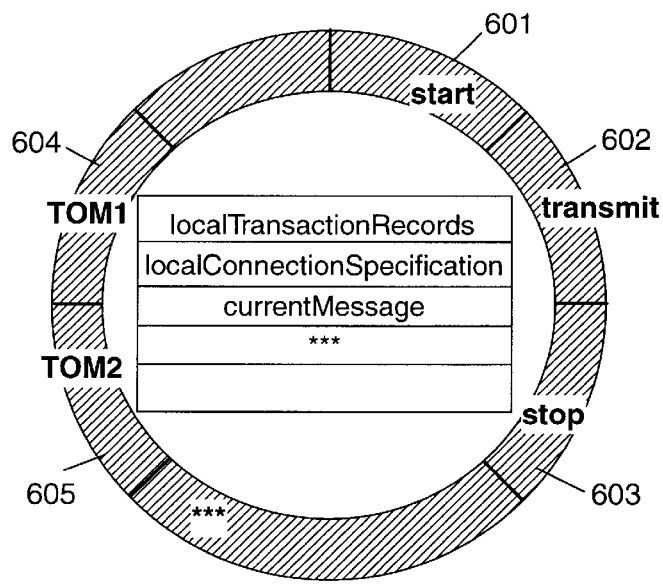
Figure 8:
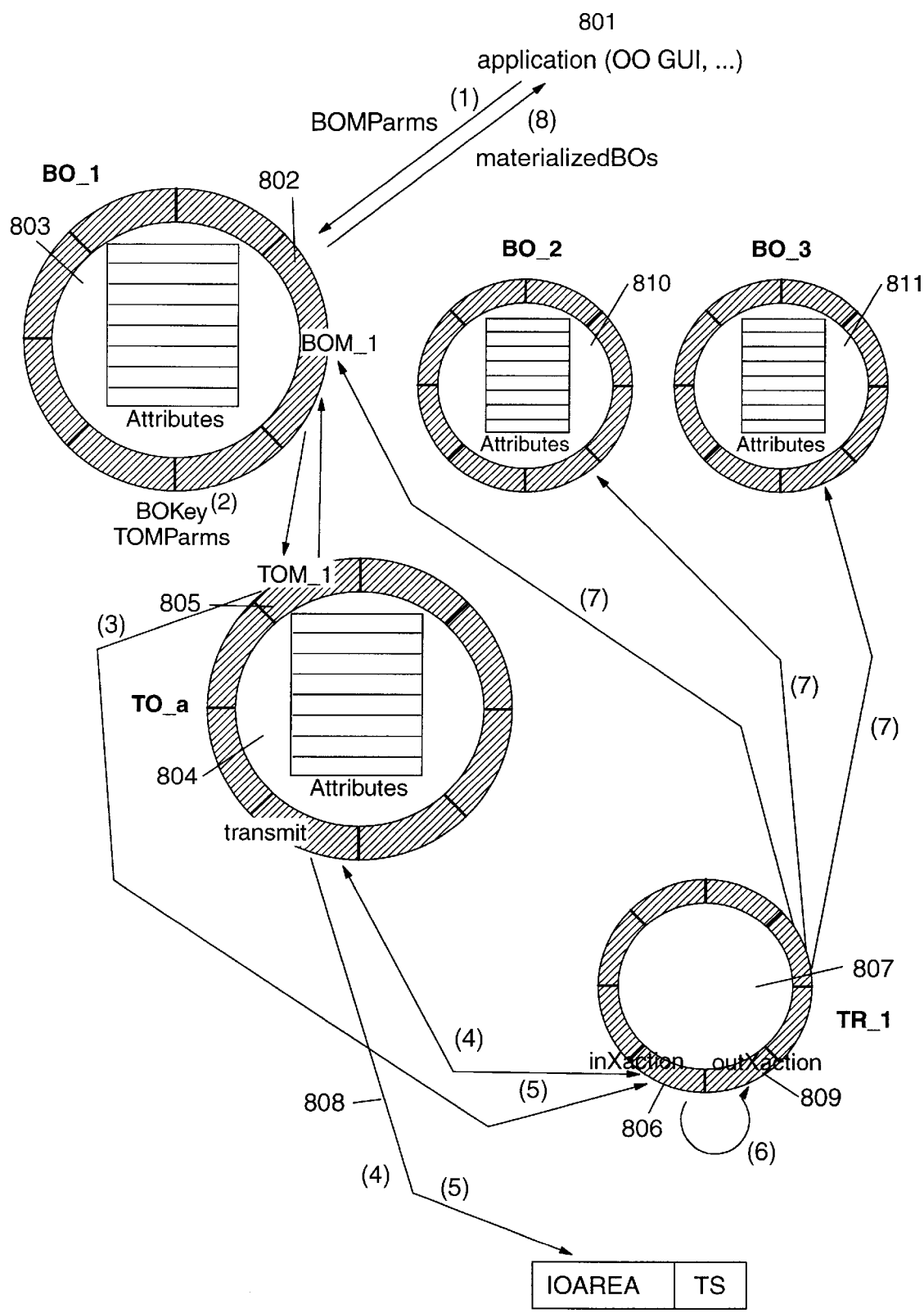

FIG. 1 is a diagram reflecting the associations of BOAs with the input and output parameters of the BAs FIG. 2 is a diagram of a TR and its relation to BOs and BOAs FIG. 3 is a diagram visualizing the CO class and its abstract protocol FIG. 4 is a diagram visualizing some concrete implementation alternatives for the abstract protocols FIG. 5 is a diagram of the TO class hierarchy and the problem specific TO classes FIG. 6 is a diagram of the architectural features of a problem specific TO class FIG. 7 visualizes the sub-classing process of problem specific BO classes FIG. 8 offers an overview on the conceptual interplay of major architectural elements

4 DESCRIPTION OF THE PREFERRED EMBODIMENT

The illustrating embodiment of the invention is based upon BAs running under control of a Transaction Management System, in the current case the well-known IMS (Information Management System) of IBM corporation. BAs in terms of the invention are represented as real transactions in this environment. As already indicated in the previous discourse the invention relates to any type of BA not just transactions in the sense of a transaction monitor. The invention has been successfully implemented and verified within a Smalltalk based environment.

Outstanding elements and principles of the embodiment are:

The substantial target is the definition and support of true Business Objects (BOs), i.e. of objects with a real meaning as a unique entity or concept in terms of the underlying business. The identification of the BO is, of course, the result of a human analysis of the legacy application in conjunction with the business domain. The approach therefore will assume that the BO identities are available as an outcome of a preceding object-oriented analysis, which according the experience, is straightforward if the knowledge of the legacy application is available. The problem of "large" objects with delusive identity as encountered the wrapping techniques is thus avoided.

Support of these identified BOs in the migration architecture and environment means:
  It must be possible to define and realize (implement) the BOs.
  BO methods could finally result in the execution of underlying, migrated IMS transactions.
  Input/output parameters of the BO methods will relate either to BO attributes or to independent parameters of the BO methods themselves.

Modification of the underlying legacy application (IMS transactions in this case) should be limited to a minimum thus allowing a maximum of reuse of prior application development efforts. It will be pointed out below that in the case migration of IMS applications no modification of the legacy application is required at all.

This migration architecture and environment therefore can be viewed as a mediator between the legacy code and the BOs. The BOs on the other hand are the ideal basis
  for new types of graphical user interfaces (GUIs)
  as integration platform with additional applications
    either as additional BO methods
    or as participants of a larger workplace in which the BOs are part of IMS offers IBM's Advanced-Program-to-Program-Communication (APPC) protocol suite, a concrete protocol for communication purposes between programs across computer system boundaries. In addition APPC is available in IMS as a so-called "implicit-APPC"

support allowing especially IMS transactions, which originally have been developed for a 3270-type of terminal only, to be scheduled for execution transparently to the transaction from remote via APPC and to exchange data simulating a 3270-type terminal interaction based on the APPC protocol suite. The embodiment of the invention is based on the exploitation of that implicit APPC support.

BOs in the sense of the migration architecture are carriers of persistent data re-instantiated according user needs. Interaction with the BOs via the BO methods transparently will retrieve or modify BO data based on the existing interfaces of the remote transactions.

An analysis of existing transaction applications will reveal that typically
  input/output data of a transaction is related not only to a single BO. Execution of a transaction thus could result in the transparent reference/instantiation of a multitude of BOs.
  a single transaction is related to a true subset of BO attributes only. This leads to the interesting effect that instantiation of the BOs may occur partially only, i.e. only with respect to a subset of BO attributes. BOs are made available only to the extend actually necessary. As desired the number of available BO attributes increases dynamically resulting in very effective and economic handling of storage resources.

The migration architecture itself is to be implemented with OO-techniques.

In a nutshell the migration architecture and environment supports an OO-access on existing transaction applications whereas the granularity of this access is defined by BOs.

The method proposed by the invention and implemented in the embodiment below will be named an architecture in the succeeding description. Individual parts of the overall method are discussed as architectural elements.

4.1 The Overall Architecture

According to the current approach the overall problem of making the set of existing Online Transaction Processing Applications (OLTP) available to the cornerstones of the concrete business model, i.e. to the business objects, and encapsulating (wrapping) these transactions within methods, i.e. messages, the BOs are responsible to has been reduced to a set of interacting basic object types, i.e. object classes. These limited set of object classes build the architecture of the approach.

Of course the overall architecture itself is realized with a set of classes in the sense of an object-oriented programming language (in this case Smalltalk) offering a framework of classes with carefully adapted functionality. Migration of an existing OLTP application to this proposed architecture means to implement a set of application specific classes by the process of sub-classing from the fundamental architecture base classes. At run-time instances of these application specific object classes will then support transparent execution of the existing OLTP transactions using BO attributes as OLTP parameters. The application specific classes implement that part of the overall functionality which is not generically available within the architectural base classes. This OO-type approach reduces the application-specific development effort significantly and at the same time increases the implementation flexibility. Thus the client system offers a set of persistent BOs. Interactions with the BOs may transparently result in the execution of OLTP transactions completely hiding the underlying transaction system, the specific structure of transactions, the data bases manipulated by the transactions and of course the communication details of the client and the serving computer system running the OLTP application.

The proposed architecture reverses the view of a transaction which in the past has been based on the functional approach. Traditionally transactions would be viewed as a process combining a well-defined set of attributes of BOs. The current architecture inverts this view as the fundamental entities are the persistent BOs which can be manipulated by sending messages some of which result in the execution of traditional transactions.

The major architectural elements to be discussed individually are:
1. Business Objects (BOs)
2. BO Instance Space (BOIS)
3. Transaction Records (TRs)
4. Communication Objects (COs)
5. Transactional Objects (TOs)

4.2 Architectural Element

Business Objects (BOs) (Part 1)
  BOs are the key elements of the overall architecture as
    all other architectural elements are accessible in an indirect manner only by interacting with the BOs
    the set of BO classes and BO instances form a layer shielding a BO exploiter from the rest of the migrated OLTP application and from the legacy application itself.

As indicated already by the name, BOs are the objects which in a straightforward sense are those entities the business domain is dealing with. With respect to nature and granularity the BOs are representing the model of the enterprise domain. Obvious BO examples are customers, contracts, orders, accounts, etc. Excluding at this point in time the behavioral aspect of BOs their definition process encompasses two steps:
1. Discovery of the BO identity
2. Discovery of the BO attributes With respect to the BO identity one or a combination of the following approaches can be applied:
  According to experience very often BO identities result quite evidently from the business domain by just asking for the entities the particular business is operating with.
  For certain branches specific data models independent from a specific company have been developed. For example the finance and insurance businesses have been modeled very accurately by certain data models (Finance Application Architecture—FAA and Insurance Application Architecture—IAA). If available, these data models directly can be used to deduce the BO identities.
  Of course in more obstinate cases an object-oriented analysis (OOA) might be required using one of the available methodologies for identifying the relevant BOs.

As BOs are carriers of persistent data to be retrieved and manipulated through the use of existing transactions, the BO's data spectrum is to be defined as the set of BO attributes. As an outstanding property the current approach of discovering and defining the BO attributes is characterized by the peculiarity that it is based upon the input and output data spectrum of the existing transaction application, or in other words, it is based upon the existing transaction's user interface (UI) specifications. To understand the background and advantage of this methodology it has to be realized
  that the UI specifications directly reflect the business related data, i.e. the data elements a business user of the transaction applications is dealing with. According to the experience with this type of approach based on this business point of view the data elements essential to the business domain can be determined and related to the different types of BOs as BO attributes easily and very efficiently.

that the existing transactions will be used in a later step for retrieval and manipulation of the BO data. The data being part of the UI specification therefore exactly delimits the data spectrum available as BO attributes.

that this avoids to analyze complicate data base structures grown historically in an evolutionary process. In addition the data bases themselves do not contain the business relevant data directly as certain types of mappings often occur between the data bases and user interface reflected data.

As the number of transactions of a specific application migrated to the current architecture increases the BO attribute spectrum will have to be enriched. Thus the process of defining the BO attributes is an iterative one. The data accessible through the transactions typically resides in (sometimes a multitude of) data bases. The BO classes therefore model various types of persistent BOs. To be able to uniquely identify the various instances of a BO of a single class the set of BO attributes has to distinguish BO key attributes
Typically they are represented by (a very small) subset of the BO attributes which, with respect to the underlying data bases, uniquely identify together with the BO class a certain BO instance. Of course the BO key attributes directly result from the key attributes of the corresponding data bases.

BO general attributes
All the rest of the BO attributes, not allowing to uniquely distinguish the various BO instances within the data bases, are referred to as general attributes.

When relating the BO attributes with the UI specification of a multitude of existing transactions, following fundamental observations are of importance The input/output data elements in the UI specification of an existing transaction may refer to a subset of BO attributes. That is, with respect to a certain BO class only part of its attribute spectrum can be related to the input/output data elements of a single transaction. Conversely, there exist further BO attributes which do not occur within the input/output data elements of a certain transaction.

The input/output data elements in the UI specifications of an existing transaction may refer to subsets of attributes of different BOs.

Different attributes of a certain BO may refer to input/output data elements of different transactions.

The process of relating the input/output data elements of existing transactions to the BO attributes together with the above observations is visualized within FIG. 1. FIG. 1 shows two different BAs, a BA (110) and a BA called (120). Further 2 different BO classes (130) and (140) together with their attributes (131) and (141) are depicted.

Certain input and output parameters are of importance for guiding BA (110). These parameters are part of two panels (111) and (112) on a 3270 computer terminal screen. In the example of FIG. 1 the input and output parameters of BA (120) are to be found within panel (121). The connecting lines within FIG. 1 reflect for example that input/output parameter (113) of BA (110) is related to the BOA (132) of BO class (130) and vice versa input/output parameter (122) of BA (120) is related to the BOA (132) of BO class (130) and vice versa input/output parameter (114) of BA (120) is related to the BOA (142) of BO class (140)

and so forth 4.3 Architectural Element
BO Instance Space (BOIS)

Each instantiated BO is stored together with the other BOs within a specific collection, called the BO Instance Space (BOIS). As every BO is uniquely identified by the class of the BO together with the specific values of the BO key attributes this set of information also is sufficient for unique identification of BO instances within the BOIS.

The necessity of introduction of the concept of a BOIS is a direct consequence of the observations discussed in the chapter "Architectural Element: Business Objects (BOs) (Part 1)": if a single transaction typically delivers only parts of the spectrum of the attribute values of a BO instance and if thus the execution of multiple transactions is required to stepwise complete the BO attribute values, it must be possible to search for the possible existence of a certain BO instance at a unique place to stepwise complete/update the attribute values of a certain BO instance and at the same time to make the updated BO instance available to all exploiters of the BO.

This partial BO instantiation extended by the process of stepwise completion of BO attributes is called materialization in the following to distinguish it from a complete instantiation. This concept of materialization offers some very attractive advantages:

It allows for the operation with incomplete data.

In contrast with other persistence models it offers very economical usage of storage. BO instances are not instantiated with respect to their whole attribute spectrum. This is of special importance as on the level of business relevance objects can become very large. BO instances are materialized only to the extend actually required by the exploiter.

During lifetime of a BO instance its attribute spectrum may be completed step-by-step.

Directly correlated with the BOIS is the question of the lifetime of a certain BO instance. As in the general case a multitude of transaction executions might be required for a BO materialization, a BO instance must have a lifetime larger than that of an underlying materializing transaction. In the current solution a BO instance "lives", if not deleted explicitly by an exploiter, as long as at least one exploiter is referring to that BO instance.

The current BOIS implementation offers two BOIS alternatives from which an exploiter of the architecture may choose. For an individual BO an exploiter may decide whether the BO instance resides within an implicit BOIS
The implicit BOIS will be the standard selection of an exploiter as its handling does not require any further activities of the exploiter. If in the case on an implicit BOIS the BOIS determines that there is no exploiter of this specific BO instance it transparently and automatically removes that BO. The current implicit BOIS implementation is based upon the Smalltalk garbage collector.

explicit BOIS
An explicit BOIS may be viewed as a kind of private BOIS the usage of which probably will be an exception. In case of an explicit BOIS an exploiter will have to interact with the BOIS to inform the BOIS to delete a certain BO from the BOIS. Thus the BO deletion no longer will be performed transparently.

4.4 Architectural Element

Transactional Objects (TOs) (Part 1)

When calling a certain transaction it expects in the general case a certain amount of data as an input data block. As a result of the execution an output data block is returned. With respect to IMS these data blocks are called IOAREAs (input/output area). From their inherent meaning the input/output data blocks can be viewed as a message known to the transaction which are exchanged for transaction invocation and return.

The various types of messages are modelled as specific object classes called Transaction Records (TRs). The important point about TRs is that they represent not an unstructured stream of bytes. TRs are equipped with descriptive information defining for each parameter, being part of the message, the exact location, its length, its type, . . .

defining for each parameter
the specific BO class
the specific BO attribute
it is representing defining the parameters not related to a certain BO class, but nevertheless represent input/output data of the transaction Thus the TR architectures the central link between the BO classes and corresponding BO attributes on one side and the individual input/output parameters of a transaction. TRs therefore store the mapping information from a data element within an input/output message onto a data element within a BO class, a BO attribute, and vice versa. As already discussed together with the architectural element of a BO, different parameters of a message, i.e. different parameters of a TR, may be related with BO attributes of different BO classes. This mapping information is of fundamental importance to support BO materialization
Using the mapping information it is possible to store each parameter of an output message of a transaction into the correct BO attribute thus guiding the materialization process.

to support the creation of an input message triggering the transaction execution
Based on the mapping information it is possible to create an input message processable by a certain transaction and to fill it
a with data resulting from well-defined BO attributes
with data from additional input parameters not related to a certain BO class The relation between the individual data elements in a TR and the corresponding BO attributes is visualized in FIG. 2. FIG. 2 portrays the mapping between the input or output data block (IOAREA), i.e. the BA message, the individual input or output parameters within that block and the BOAs of the individual BO classes arranged by TR class. (200) shows a TR class encapsulating an input or output data block (201), which is assembled from the individual input or output parameters (202)–(207). Further a BO class (220) together with its BOAs (221), a BO (230) together with its BOAs (231) and a BO (240) together with its BOAs (241) are shown. The mapping managed by the TRs is represented by the connections drawn between individual input or output parameters of the BA message and individual BOAs of certain BO classes. For example input or output parameter (202) is associated with BOA Parm1 (222) of BO (220)

and so forth, up to the final association where input or output parameter (207) is associated with BOA (242) of BO (240)

4.5 Architectural Element

Communication Objects (COs)

Communication basically consists in exchanging information. The basic and architectural information unit in the current approach is a message which is made up from 2 parts:

message text
The message text is the actual stream of bytes embodying the atomic input/output data of a transaction. Therefore the message text is the block of data a TR operates on to map sub-elements to BO attributes and vice versa (refer for instance to the chapter "Architectural Element: Transaction Records (TRs) (Part 1)").

Transaction Suffix (TS)
To understand the nature of a TS recall that when receiving an output message text from a transaction there is in general no indication available identifying the type and therefore the layout of the concrete message. This behavior is the consequence of several causes Knowing the particular transaction to be executed and the input message text to be processed it cannot be deduced in advance the type of output message text to be expected. Depending on the data of the input message text and depending on the additional data stored in the data base environment the transaction is executing in, different output messages texts may be generated by the transaction.

Depending on the input message text and additional information in the data bases, an executing transaction may decide to call a different transaction which generates the output message text. Thus even the identity of the responding transaction is in the general case unknown in advance.

As an architectural solution to above problems the current approach suggests to tag every message text with an additional information element called Transaction Suffix (TS). A TS, of course itself represented by an object, stores two types of information a. the name of the specific transaction the message relates to
b. the specific message type, i.e. its layout The TS is appended as a kind of suffix to a message. The ideal place for generating and appending the TS to the output message is a post-processor executing in the transaction environment after the actual transaction completed its processing.

In the case of the IMS transaction monitor these information elements are a. TRANCODE
An 8 byte code identifying a transaction.

b. MODNAME
An 8 byte code identifying the specific panel mask the message relates to.

As in the case of IMS the implicit-APPC-support, which uses the PC protocol suite to communicate the messages to/from existing IMS transactions, a simple APPC-exit can be introduced into the IMS system as a post-processor to generate the particular TSs.

As the methodology of communicating and exchanging messages (in the sense mentioned above) with a transaction always follows a single type of protocol it has been realized within a specific object class called Communication Objects (COs). The protocol always encompasses the following steps which are implemented as instance methods of a CO of class BplCommunication accordingly:

start: aConnectionSpecification
  the start: method requires as a parameter an object containing all data required to setup a communication connection; for instance
    the address of the (remote) computer system
    the specific transaction to be started
    authorization related data like userid and password
    etc.
  Based on the connection specification in the object aConnectionSpecification a communication connection is set up (if not already active) and the transaction will be started ready for receiving the first message to be processed.
transmit: aMessage
  The transmit: method requires as input an object aMessage representing the input message to be sent to the transaction for processing.
  The transmit: method will then wait for the output message generated by the transaction, which will be delivered to the caller of the transmit: method afterwards; i.e. on return transmit: delivers the output message consisting in the message text and the TS.
  Execution of the transmit: method may be requested several times.
stop
  The stop method is meant to stop the execution of the transaction and to abandon the communication connection.

FIG. 3 reflects an instance of a CO of class BplCommunication with the methods discussed above representing the protocol for message exchange with the transaction. As the above protocol is only an abstract protocol which actually has to be processed by a concrete protocol like
  a conversational model, realized by APPC for example
  a general message based model, realized by MQI (Message Queuing Interface) for example
  a remote procedure call model, realized by TCP/IP RPC (Transmission Control Protocol/Internet Protocol Remote Procedure Call) for example
  a 3270 emulation model, realized by EHLLAPI (Emulator High Level Language Application Programming Interface for example
  etc.
At migration time at least one concrete protocol implementation has to be chosen like BplAPPC which has been used for the current implementation operating with IMS transactions. Sub-classes can be introduced implementing the discussed abstract protocol my mapping it onto a concrete protocol implementation. This sub-classing process is illustrated in FIG. 4. The CO class (401) realizes the general features of the abstract protocol. The abstract protocol is mapped onto various concrete protocols within the CO sub-classes (402) to (405).

4.6 Architectural Element
Transactional Objects (TOs) (Part 1)
  Transactional Objects (TOs) are the classes to represent a model of at least one transaction. If a certain set of transactions is executed only as group always in a predefined sequence, it may be reasonable to model such a group of transactions as a single TO.
  Without restriction of generality let's assume for the further description that just a single existing transaction is encapsulated by a TO.

4.6.1 The Architectural Class Variable localConnectionSpecification
  To allow a TO instance to set up a communication connection to the possibly remote transaction defining information like
    the address of the remote computer system
    the specific transaction to be started
    authorization related data like userid and password
    the concrete CO class to be used for communication (refer to CO details in the chapter "Architectural Element: Communication Objects (COs)")
    etc.
  is stored in an object referred to by the TO class variable localConnectionSpecification.

4.6.2 The Architectural Instance Variable localTransactionRecords
  The handling of the messages is a cooperative task performed by the TO itself and its uniquely related TR instances. At the point in time a TO is going to be instantiated also all the related TRs are instantiated in parallel thus making the combination of TO and TR instances able to handle all message exchanges with the transaction. The TO instance variable localTransactionRecords stores in a dictionary all TR instances required for the message flow handling of this particular TO; i.e. the TO knows all messages which are of importance when communicating with that specific transaction.

4.6.3 The Architectural Instance Variable currentMessage
  A TO instance stores the current message to be processed, either to be sent to the transaction or to be received from the transaction, within the instance variable currentMessage. This common storage location eases the cooperation of the TO instance and its related TR instances significantly.

4.6.4 The Architectural Instance Method start
  Already at that point in time when a TO instance is established an architectural TO instance method start is executed
    to create a CO instance
    to establish a communication connection
    to start the remote transaction
  with the help of the corresponding start: method of the CO instance and the information in localConnectionSpecification.

4.6.5 The Architectural Instance Method stop
  The instance method start has a counterpart method stop to stop the transaction and to abandon the communication connection.

4.6.6 Parallel TO Execution
  As each instantiated TO encompasses its own communication connection any number of TO instances, even of the same class, may operate in parallel.

4.6.7 Transaction Steps and Problem-Specific TO Methods (TOMs) (Part 1)
  Only in rare circumstances execution of a transaction is the result of a single message exchange of a requesting and an answering message with the transaction being completed afterwards. In most cases a possibly lengthy sequence of message exchanges, i.e. exchange of panel screens, occur from the start to the completion of a transaction. Generally such types of transactions are named conversational transactions for obvious reasons. Typically a sequence of message exchanges representing a single transaction can be decomposed in a sequence of transaction steps. Each transaction step starts with a message containing information specified by a user, is followed by receiving and sending further messages which could be processed automatically, ending with (but including) a message to be sent to the transaction which again requires information by a user. Thus transaction steps are a decomposition of conversational transaction execution into units of message sequences which can be executed automatically without human intervention. Each of these transaction steps will have to be modelled as an individual instance method of the TO called Transaction Object Method (TOM).

Two types of parameters could be part of a TOM invocation key attributes uniquely identifying BO instances If for setting up the message to be sent to the transaction, data is required belonging to BOs, then only the key attributes identifying the BOs are to be specified. As described below generic TO logic is able to retrieve the required BO attribute data for setting up the input message to the transaction.

additional TOM method parameters

This type of parameter is required only if the parameter does not represent an attribute of some BO.

When being called, a TOM triggers to send a message to the (remote) transaction. As the TOM executes a certain transaction step it knows the identity of the messages, i.e. the TRs (refer to the chapter "Architectural Element: Transaction Records (TRs) (Part 1)" for more information) which has to be prepared and sent to the transaction. The TOM issues this processing by calling an architectured instance method inXaction of that TR instance responsible for setting up the particular message.

4.6.8 The Architectured Instance Method transmit

The architectured transmit method will send the message currently stored within the instance variable currentMessage to the transaction. transmit of the current TO instance actually uses the method equally named belonging to the CO instance (established during TO instantiation) to send that message and wait at the same time for the responding message of the transaction. That response will be passed to the caller. The transmit method will be called by one of the related TR instances from within their inXaction method (see below).

4.7 Architectural Element
Transaction Records (TRs) (Part 2)

Besides the more static and descriptive aspects as depicted in the chapter "Architectural Element: Transaction Records (TRs) (Part 1)" TRs encompass also certain dynamical characteristics realized within architecturized methods. These activities are performed in concert with the specific TO instance related to the TR instance. In endorsement to the description of the architectural element of a TO (refer to the chapter "Architectural Element: Transactional Objects (TOs) (Part 1)") it has to be stressed that each TR is instantiated together with its related TO instance with which it sets up a one-to-one correspondence each TR instance knows its related TO instance The dynamical characteristics are two-fold and are realized within the following two architectural methods.

4.7.1 The Architectured Instance Method inXaction

The TR instance method inXaction is responsible for creating the correct message template to be transmitted to the transaction Which message object has to be created results from the nature of the current TO instance, as each TR is responsible for handling a specific message.

copying all required information into the TR; i.e. into the message

As outlined in the discussion on TRs in chapter "Architectural Element: Transactional Objects (TOs) (Part 1)" a TR stores descriptive information for the individual data elements of the TR. Those TR elements which represent BO attributes can be filled in using the BO key attributes being part of the TOM invocation. The BO key attributes allow the method inXaction to locate the BO instance within the BOIS and to retrieve the required BO attribute values.

Those TR elements not related to BO attributes are expected to be parameters specified as part of the TOM invocation thus permitting the inXaction method to gather this data too.

transmitting the message to the remote transaction by calling the architectured instance method transmit of the related TO instance Before this happens the current message to be sent is to be made available in the instance variable currentMessage of the related TO instance as transmit operates on behalf of currentMessage (see above).

passing the processing of the transaction's output message over to the architectural instance method outXaction of the responsible TR instance for further processing.

The responsible TR instance can be determined by analyzing the TS returned from the transmit execution (refer to the chapter "Architectural Element: Communication Objects (COs)") together with the information encoded within the instance variable localTransactionRecords.

4.7.2 The Architectured Instance Method outXaction outXaction is responsible for analyzing and processing the output message available within the instance variable currentMessage of the related TO instance by materializing all BOs affected by the TR contents As outlined in the discussion on TRs in the chapter "Architectural Element: Transactional Objects (TOs) (Part 1)" the TR stores the descriptive information for the individual data elements of the TR. Thus outXaction can determine the TR elements which represent BO attributes locate the affected BOs in the BO Instance Space BOIS or create the BO instance if not existent yet copy the BO attribute from the TR to the BO itself returning the list of materialized BOs to its caller 4.7.3 The Architectured Instance Method inXaction (Part 2)

inXaction returns to its caller the list of materialized BOs received upon return from outXaction.

4.8 Architectural Element
Transactional Objects (TOs) (Part 2)

4.8.1 Transaction Steps and Problem-Specific TO Methods (TOMs) (Part 2)

Upon return from the invocation of inXaction the TOM receives the list of materialized BOs. The TOM has to decide, based upon the output message, i.e. the TR received from the transaction, how to proceed. If the transaction step has been completed simply the list of materialized BOs is passed to its caller. The TOM triggers to send the next message to the remote transaction by issuing inXaction again with respect to that TR instance responsible for handling the next message and repeating the sequence of activity inXaction-transmit-outXaction once more.

4.8.2 Architectural TO Features and Class-Hierarchy

To reduce the amount of implementation effort for each TO class modelling an existing transaction all the generic, i.e. architectural TO features, are realized within the TO super-class BplTransactionObject. As depending on the type of transaction monitor executing a certain transaction the handling of the message flow between the TO and the remote transaction might be slightly different sub-classes may have been introduced for the individual supported transaction monitors like IMS, CICS, . . . . The sub-class BplIMSTransactionObject, BplCICSTransactionObject, . . . implement the transaction monitor related deviations. (Though the prototype concentrates on IMS only !) If such deviations do not exist these intermediate classes can be deleted. The class structure delivers the spectrum of architectural TO features like communication handling transaction invocation and message exchange BO materialization to the problem specific TO classes which are subclasses thereof. The remaining implementation effort within the problem specific TO classes representing the migrated transactions is limited to choosing the concrete communication model and defining the communication specifications modelling the TRs and TSs the TO class is responsive to realizing the concrete TOMs implementing the corresponding transaction steps TOM implementation could mean to associate a state to a TO instance which checks the sequence of TOM executions if the remote transaction does not allow TOM execution independent of the TOM predecessor.

The TO class hierarchy discussed above and some examples of problem specific TO classes are reflected in FIG. 5. The class implementing all general features of a TO is (501). If a groups of BAs are to encapsulated which show certain common behavior characteristics, for instance their are to be executed in a certain environment which requires a specific kind of handling, these commonalities can be incorporated in the TO subclasses like (502), (503), . . . . Then finally the problem specific TO calls are sub-classes hereof, like (504), (505) and (506). FIG. 6 summarizes the most important (architectural) features of a TO. (601), (602), and (603) visualize the OO-methods making up the abstract communication protocol. Further 2 problem-specific TOMs (604) and (605) are reflected.

4.9 Architectural Element

Business Objects (BOs) (Part 2)

Those methods of a BO which result in the execution of a (or part of a) transaction are called Business Object Methods (BOMs). The problem specific BOMs are the only interface to exploiters for the overall architecture to transparently execute, without knowledge of the underlying architecture, remote transactions. Two types of parameters could be part of a BOM invocation key attributes, uniquely identifying other BO instances (apart of that BO the BOM belongs to)

additional BOM method parameters This type of parameter is required only if a parameters does not represent an attribute of some BO.

Implementors of BOMs have to realize the following behavior within a BOM:

depending whether the BOM executes the first transaction step of a sequence of steps a TO instance a TO instance has to be instantiated able to execute the related transaction one or several TOMs of the instantiated TO(s) have to be called for corresponding transaction execution depending whether the BOM executes the last transaction step of a sequence of steps having completed the whole transaction execution the TO instance is to be removed again. Indirectly, removal of a TO instance also abandons the associated communication connection.

finally the BOM returns to its caller the list of materialized BOs as received from the executed TOMs.

4.10 Architectured BO Features and Class Hierarchy

TO reduce the amount of implementation effort for each BO class all generic, i.e. architectured features are realized within the BO super-class BplBusinessobject. As an example this class delivers the functionality to automatically generate getter and setter methods for all BO attributes from the list of BO attributes.

Problem specific BO classes are realized as sub-classes of the class BplBusinessObject. The remaining implementation effort within a problem specific BO class is limited to the definition of BO key and general attributes the BOM implementation The BO sub-classing process is visualized in FIG. 7. It depicts the BO super-class (701) used to derive the problem-specific BO classes (702) to (706).

4.11 Interplay of the Architectural Elements

FIG. 8 visualizes the interplay of a part of the architectural elements based on an abstract example. The numerical markers refer to the individual processing steps described below:

1.

a. Some kind of application (801) exploiting a transaction application migrated to the current architecture (for instance an object-oriented graphical user interface) calls a BOM BOM_1 (802) of a certain BO instance BO_1 (803) passing additional BOM parameters BOMParms.

2.

a. BOM_1 instantiates a TO (804) thus transparently setting up a communication connection to the remote transaction system and starting the remote transaction modelled as the current TO.

b. BOM_1 further calls a certain TOM TOM_1 (805) passing the BO key attributes BOKey and BOM method parameters TOMParms.

3.

a. The problem specific TOM TOM_1 (805) knows which message to send to the transaction. It then starts the architectural method inXaction (806) of that TR instance TR_1 (807) responsible for the handling of the particular message.

4.

a. inXaction (806) of the responsible TR instance TR_1 (807) uses the descriptive information of the TR to fill in all parameters based on the BO attributes accessible via BOKey and TOM method parameters TOMParms passed to TOM_1 (805) of its related TO instance TO_a (804).

b. Once the message has been created it is sent to the remote transaction for execution (808).

5.

a. The remote transaction sends a responsive message to the TO instance (808).

6.

a. inXaction (806) will analyze the TS of the received message to determine the concrete message, i.e. the TR instance responsible for processing the message.

7.

a. Descriptive information of the nature of the TR elements together with the TOM parameters BOKey and TOMParms of its related TO instance TO_a (804)

permit outXaction (809) of the TR instance TR_1 (807) to execute the materialization. In this example materialization results in the update of the BO BO_1 (803) and of an instantiation of 2 new BOs BO_2 (810) and BO_3 (811).

8.
  a. Control is returned back from outxaction (809) to inXaction (806), to TOM_1 (805), to BOM_1 (802) and finally to the calling application passing the list of materialized BOs with it (BO_1 (803), BO_2 (810), BO_3 (811) in this example) for further exploitation.

4.12 Important Characteristics of the Overall Architecture

The proposed migration architecture allows to "reuse" the existing legacy transaction applications not requiring their re-implementation.

As it has been possible to integrate the existing transaction applications without necessity for their modification the application may be used in the traditional environment as well as within the new architecture in parallel.

Client/server structures are realized implicitly for existing applications originally not prepared for a distributed mode of operation.

On the client side an OO view has been generated merely consisting of Business Objects, which transparently shield a BO user from all transaction details. The resulting BO structure is the ideal platform for seamless integration with other types of applications and application extensions on the client system.

Based on the BO platform new and more productive software development concepts and tools can be exploited based on the OO paradigm.

The concept of materialization allows for a dynamic and stepwise instantiation of the BO attribute spectrum. This significantly reduces the processing time for BO instantiation and memory consumption, as a BO is instantiated only to the extend actually required.

The proposed architecture introduces an advantageous distribution of processing tasks.

The server system delivers transaction capabilities.

As the server system is not used as a simple data server for storing and retrieving data but is exploited also with respect to its processing capabilities for transactions a certain amount of parallelism has been introduced.

As the server system is used as a true processing server in contrast to a data server the amount of data transmitted across the network is reduced as the remote transaction can be viewed as a data preprocessor. In addition this also reduces the security exposure because a reduced amount of data has to leave the remote system.

The proposed architecture also allows for an evolutionary restructuring of the transaction application, for instance with respect to the underlying data base structures, without influencing the client part.

Also most important the same overall architecture may be used not only for reengineering purposes. Without any changes to the description above the proposed architecture may be exploited to support new types of (remote) transactions especially developed to be exploited within the current schema, which then would not offer a separate terminal type user interface.

Summarizing the architecture proposal it allows for an economic and highly efficient migration of an existing transaction application to distributed object structures and at the same time offers an ideal platform for forward engineering of new application components.

5 Acronyms

| | |
|---|---|
| BA | Business Application |
| BOA | Business Object Attribute |
| BOGA | Business Object General Attributes |
| BOIS | Business Object Instance Space |
| BOKA | Business Object Key Attribute |
| BOM | Business Object Method |
| CO | Communication Object |
| IMS | Information Management System |
| OLTP | Online Transaction Processing |
| OO | Object Orientation |
| OOT | Object Oriented Technology |
| TO | Transactional Object |
| TOM | Transactional Object Method |
| TR | Transaction Record |
| TRO | Transaction Record Object |
| TS | Transaction Suffix |
| TST | Transactional Step |

We claim:

1. Method of generating an object-oriented (OO) access to at least one Business Application (BA) executed on a data processing system wherein said BA does not correspond to the paradigm of object-orientation comprising the steps of:
   defining at least one Business Object (BO) class with a meaning as a unique entity or concept in terms of the underlying business supported by the BA;
   defining BO attributes (BOA) of said BO class enclosing input and output parameters of said BA;
   defining at least one Transactional Object (TO) class for encapsulating said BA;
     wherein said TO class being provided to control the execution of said BA according to the peculiarities of said BA;
     wherein said TO class being provided to track the state of said BA if said BA execution requires a multitude of interactions sending or receiving input or output parameters;
     wherein said TO class being provided to extract the input parameters for BA invocation from said BOAS;
     and wherein said TO class being provided to execute the so-called materialization process consisting in;
       creating at least one BO instance of said BO class if said BO instance of said BO class is not instantiated yet and
       extracting and storing said output data parameters returned by said BA into said corresponding BOAs.

2. Method of claim 1
further comprising the step of defining at least one Transaction Record (TR) class
   said TR class being provided to model an individual input or output data block, called a BA message, enclosing those input or output parameters sent or received in one interaction with said BA;
   said TR class being provided to store descriptive information on the individual data elements assembling said BA message with respect to type, length and position within said BA message;
   said TR class being provided to store mapping information to associate a unique data element of said BA message to a unique one of said BOAs of said BO class and vice versa
and further comprising the step of associating said TR class to said TO class, which implements the capability to exchange said BA message with said BA.

3. Method as set forth in one of claim 2 further comprising the steps of
- extending said TO class with the knowledge and capability of determining its associated TR classes and extending vice versa each of said TR classes with the knowledge and capability of determining said TO class it is associated to.

4. Method of claim 3 further comprising the steps of
- extending each of said TR classes with an OO-method INXACTION
  - wherein said INXACTION being provided to determine those BO instance identities to be used for BA message creation using the BOKA values accessible from its associated TO instance;
  - wherein said INXACTION being provided to access said BO instances within said BOIS by said BOKA values;
  - wherein said INXACTION being provided to extract under control of said TR's mapping information BOA values to create a BA message and store said BOA values into the related positions of said BA message as said BA message data elements;
  - wherein said INXACTION being provided to send said created BA message by calling the OO-method TRANSMIT of said associated TO instance to said BA for further processing;
  - wherein said INXACTION being provided to passe a currently received BA message as BA output over to the OO-method OUTXACTION of that TR instance responsible for handling the received BA output message;
- further extending each of said TR classes with an OO-method OUTXACTION for processing said currently received BA message by enriching BO instances with BOA values stored in said BA message in a process called Incremental Partial BO Materialization, or Materialization for short,
  - wherein said OUTXACTION being provided to determine under the control of said TR's mapping information all BO instances touched by said currently received BA message data elements by either retrieving from said currently received BA message BOKA values for said touched BO instances or by retrieving said BOKA values from said associated TO instance which stores all BOKA values of all BO instances materialized under its control in a context;
  - wherein said OUTXACTION, based on said BOKA values, first searches for each touched BO instance within the BOIS, if said touched BO instance could be located in said BOIS it will be used during the materialization process, whereas, if said touched BO instance could not be located within said BOIS, a new BO instance will be created within said BOIS;
  - where said OUTXACTION will, under control of said TR's mapping information, copy each of said currently received BA message data element into the corresponding BOA of said touched BO instance thus incrementaly materialize the BOAs of said BO instance;
  - where said OUTXACTION returns to its caller the object references of all touched BO instances materialized during the current execution of OUTXACTION.

5. Method according to one of the claim 4 further comprising the steps of
- assembling the complete sequence of interactions of said BA execution from the very beginning up to the completion in at least one sub-unit, called Transactional Step (TST), being provided for autonomously generating and exchanging at least a first BA message with said BA and completing execution once a BA message is returned by said BA defined as the last BA message of said TST said last BA message optional defines the start of a next TST and
- encapsulating said TST as a unique OO-method called Transactional Object Method (TOM) of said TO class.

6. Method of claim 5 further comprising the steps of
- extending said BO class by at least one OO-method, called a Business Object Method (BOM), encapsulating a functional part offered by BAs;
- said BOM being provided to first create at least one new TO instance if a TOM is to be executed of a TO instance which is not instantiated yet or otherwise use at least one already available TO instance;
- said BOM being provided for calling at least one TOM offered by said TO instance.

7. Method of claim 5 further comprising the steps of
- extending said TO class being provided for locating at least one TR instance and for calling said TR instance's INXACTION OO-method associated with said TO instance capable of generating and exchanging at least one BA message with said BA;
- extending said TOM of said TO class being provided for returning object references of BO instances materialized during execution of said TOM to its requester;
- extending said BOM of said BO class being provided for returning object references of BO instances materialized during execution of said BOM to its requester.

8. Method of claim 7 wherein said OO-methods INXACTION and OUTXACTION are, as an alternative approach, integrated within said TO class and not within said TR class.

9. Method as set forth in one of claim 1 further comprising the step of
- separating said set of BOAs of said BO class into two subsets, a first subset of BOAs, called BO Key Attributes (BOKA), with the outstanding property that each combination of BOKA values identifies uniquely and exactly one BO instance within said BO class independently of the BOA values of a second subset of BOAS, called BO General Attributes (BOGA), which is made up of all the rest of said BOAs.

10. Method of claim 9 further comprising the step of
- establishing a BO Instance Space (BOIS)
  - being provided to store all BO instances after creation and being provided to allow to retrieve a certain BO instance based upon the information of the BO class and the BOKA values of said BO instance.

11. Method of claim 10 further comprising the step of
- defining several types of said BOIS
  - at least one so-called explicit BOIS for storing and retrieving said BO instances of at least one specific BO class
  - and a so-called implicit BOIS which will be used if none of said explicit BOISs has been defined for storing and retrieving of BO instances of a specific BO class.

12. Method of claim 11 further comprising the step of
- enhancing said BOIS by controlling means for supervising of whether any of said BO instances stored within said BOIS is referenced by any other object in the system and once the last reference to any one of said BO instances is removed said controlling BOIS deletes said BO instance transparently.

13. Method as set forth in one of claim 1 further comprising the step of
- extending said TO class by a set of OO-methods embodying an abstract protocol to interact with said BA encompassing
  - a OO-method START, being provided to set up a communication connection using anyone of the available communication protocols, if said BA is executed on a remote data processing system, and to start execution of said BA assigned to said TO class;
  - a OO-method STOP, being provided to complete and stop execution of said BA and, if said BA is executed on a remote data processing system, to close the communication connection to said remote system;
  - a OO-method TRANSMIT, being provided
    - to transfer a first BA message to said BA for processing, freeing said requester from knowing and understanding any communication details,
    - to wait on a second BA message returned from said BA as a processing result of said first BA message.

14. Method of claim 13 and further comprising the steps of
- generating at least one Communication Object (CO) class offering an abstract protocol consisting in OO-methods START, STOP, TRANSMIT with equal semantics as the abstract protocol of said TO class;
- encapsulating communication relevant aspects within said CO class and, if said BA is to be executed on a remote data processing system, mapping said abstract protocol onto a concrete protocol used to connect said data processing systems in a computer network;
- associating said CO class to said TO class;
- extending the START OO-method of said TO instance to create an instance of said associated CO class to call the corresponding START OO-method of said associated CO instance;
- extending the STOP and TRANSMIT OO-methods of said TO instance to call the corresponding methods of said associated CO instance for execution of said concrete protocol said CO instance is based upon.

15. A data processing system comprising a storage unit in which object structures derived by methods of claim 1 is stored.

16. A data processing system according claim 15 wherein said object structures are incorporated preferably in object-oriented technology
- incorporating the general functionality being not specific to a certain BO class in a OO-super-class BplBusinessObject for execution by the application specific BO classes via the OO-inheritance concept;
- and/or incorporating the general functionality being not specific to a certain TR class in a OO-super-class BplTransactionRecord for execution by the application specific TR classes via the OO-inheritance concept;
- and/or incorporating the general functionality being not specific to a certain TO class in a OO-super-class BplTransactionObject for execution by the application specific TO classes via the OO-inheritance concept;
- and/or incorporating the general functionality of the CO class in a class BplCommunicationObject and further incorporating all aspects dependent on the various concrete communication protocols in subclasses of said BplCommunicationObject selective for execution by TO classes.

17. Method of executing on a data processing system at least one Business Application (BA) wherein said BA does not correspond to the paradigm of object-orientation
comprising a step in which a Business Object (BO), being an instance of a BO class with a meaning as a unique entity or concept in terms of the underlying business supported by the BA and said BO contains BO attributes (BOA) of said BO class enclosing input and output parameters of said BA, calls a method of at least one Transactional Object (TO), being an instance of a TO class for encapsulating said BA;
comprising a step in which said TO controls the execution of said BA according to the peculiarities of said BA;
comprising a step in which said TO tracks the state of said BA if said BA execution requires a multitude of interactions sending or receiving input or output parameters;
comprising a step in which said TO extracts the input parameters for BA invocation from said BOAs;
comprising a step in which said TO executes the so-called materialization process consisting in;
- creating one or more BOs of one or more additional BO classes if said BO instances of said additional BO classes are not instantiated yet and
- extracting and storing said output data parameters returned by said BA into said corresponding BOAs of said BOs.

18. Method of claim 17
wherein the steps of
- extracting the input parameters for BA invocation from said BOAs and of
- executing the so-called materialization process
is accomplished by at least one Transaction Record Object (TRO) being an instance of a TR class associated to said TO class
- said TR class being provided to model an individual input or output data block, called a BA message, enclosing those input or output parameters sent or received in one interaction with said BA;
- said TR class being provided to store descriptive information on the individual data elements assembling said BA message with respect to type, length and position within said BA message;
- said TR class being provided to store mapping information to associate a unique data element of said BA message to a unique one of said BOAs of said BO class and vice versa
and wherein the step of sending or receiving input or output parameters is accomplished by said TRO by exchanging said BA message with said BA.

19. Method of claim 18
wherein the step of sending a BA message to said BA as indicated in claim 18 is accomplished by an OO-method INXACTION of said TRO of said TR class
- wherein said INXACTION determines those BOs identities to be used for BA message creation, using those subset of BOAs, called BO Key Attributes (BOKA), with the outstanding property that each combination of BOKA values identifies uniquely and exactly one BO within said BO class independently of the BOA values of the rest of said BOAS, said BOKA values accessible from its associated TO;
- wherein said INXACTION accesses said BOs within a BO Instance Space (BOIS) provided for storing and retrieving said BOs based upon the information of said BO class and said BOKA values of said BO;
- wherein said INXACTION extracts under control of said TRO's mapping information BOA values to create a BA message and store said BOA values into the related positions of said BA message as said BA message data elements;

wherein said INXACTION sends said created BA message to said BA for further processing;

wherein said INXACTION passes a currently received BA message as BA output over to the OO-method OUTXACTION of that TRO responsible for handling the received BA output message;

wherein the step of receiving a BA message of said BA as indicated in claim 18 is accomplished by an OO-method OUTXACTION of said TRO of said TR class for processing said currently received BA message by enriching BOs with BOA values stored in said BA message in a process called Incremental Partial BO Materialization, or Materialization for short, wherein said OUTXACTION determines under the control of said TRO's mapping information all BOs touched by said currently received BA message data elements by either retrieving from said currently received BA message BOKA values foresaid touched BOs or by retrieving said BOKA values from said associated TO which stores all BOKA values of all BOs materialized under its control in a context;

wherein said OUTXACTION, based on said BOKA values, first searches for each touched BO within the BOIS, if said touched BO could be located in said BOIS it will be used during the materialization process, whereas, if said touched BO could not be located within said BOIS, a new BO will be created within said BOIS;

where said OUTXACTION will, under control of said TR's mapping information, copy each of said currently received BA message data element into the corresponding BOA of said touched BO thus incrementally materialize the BOAs of said BO;

where said OUTXACTION returns to its caller the object references of all touched BO materialized during the current execution of OUTXACTION.

* * * * *